(12) United States Patent
Nammi et al.

(10) Patent No.: US 10,826,652 B2
(45) Date of Patent: *Nov. 3, 2020

(54) ADAPTIVE INTERLEAVER FOR WIRELESS COMMUNICATION SYSTEMS

(71) Applicant: AT&T Intellectual Property I, L.P., Atlanta, GA (US)

(72) Inventors: SaiRamesh Nammi, Kista (SE); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/595,599

(22) Filed: Oct. 8, 2019

(65) Prior Publication Data
US 2020/0044777 A1    Feb. 6, 2020

Related U.S. Application Data

(63) Continuation of application No. 16/166,527, filed on Oct. 22, 2018, now Pat. No. 10,476,635, which is a
(Continued)

(51) Int. Cl.
*H04B 7/02* (2018.01)
*H04L 1/00* (2006.01)
(Continued)

(52) U.S. Cl.
CPC ......... *H04L 1/0071* (2013.01); *H04B 7/0413* (2013.01); *H04B 7/063* (2013.01);
(Continued)

(58) Field of Classification Search
CPC ..... H04L 1/0071; H04L 1/0009; H04L 1/002; H04B 7/0413; H04B 7/0626; H04B 7/063; H04B 7/0632; H04B 7/0639
(Continued)

(56) References Cited

U.S. PATENT DOCUMENTS 6,542,736 B1    4/2003   Parkvall et al.
6,959,048 B1   10/2005   Horneman et al.
(Continued)

FOREIGN PATENT DOCUMENTS

WO    2018/111578 A1    6/2018
WO    2018/148673 A1    8/2018

OTHER PUBLICATIONS

U.S. Appl. No. 16/166,527, filed Oct. 22, 2018.
(Continued)

*Primary Examiner* — Helene E Tayong
(74) *Attorney, Agent, or Firm* — Amin, Turocy & Watson, LLP

(57) ABSTRACT

The described technology is generally directed towards adaptive interleaving in network communications systems based on one or more conditions with respect to user equipment. When conditions such as the speed of the user equipment indicate that performance can be increased by interleaving the data traffic, data is transmitted to the user equipment using an adaptive interleaver in the coding chain of MIMO systems. The adaptive interleaver is not used when conditions indicate performance is unlikely to improve. Adaptive interleaving may be performed in the frequency domain, in the frequency and time domain, or the frequency time and space domain. Multiple interleavers with different interleaving patterns may be used in the frequency domain and in the frequency and time domain. Adaptive interleaving may be based on one or more various criteria corresponding to the condition data received from the user equipment.

20 Claims, 12 Drawing Sheets

Related U.S. Application Data continuation of application No. 15/623,963, filed on Jun. 15, 2017, now Pat. No. 10,158,454.

(51) Int. Cl.
*H04B 7/0413* (2017.01)
*H04B 7/06* (2006.01)

(52) U.S. Cl.
CPC ......... *H04B 7/0626* (2013.01); *H04B 7/0632* (2013.01); *H04B 7/0639* (2013.01); *H04L 1/0009* (2013.01); *H04L 1/0025* (2013.01)

(58) Field of Classification Search
USPC ....................................................... 375/267
See application file for complete search history.

(56) References Cited

U.S. PATENT DOCUMENTS

| | | | |
|---|---|---|---|
| 8,401,100 | B2 | 3/2013 | Miyoshi et al. |
| 8,929,196 | B2 | 1/2015 | Novak et al. |
| 9,072,099 | B2 | 6/2015 | Ekici |
| 9,112,758 | B2 | 8/2015 | Niu et al. |
| 9,338,774 | B2 | 5/2016 | Ihm et al. |
| 9,363,805 | B2 | 6/2016 | Kim et al. |
| 9,414,370 | B2 | 8/2016 | Kim et al. |
| 9,544,107 | B2 | 1/2017 | Chun et al. |
| 9,654,196 | B2 | 5/2017 | Nammi |
| 2005/0030887 | A1 | 2/2005 | Jacobsen et al. |
| 2005/0135493 | A1 | 6/2005 | Maltsev et al. |
| 2005/0138524 | A1* | 6/2005 | Cioffi ...................... H04B 3/32 714/758 |
| 2006/0063543 | A1 | 3/2006 | Matoba et al. |
| 2006/0064610 | A1 | 3/2006 | Starr |
| 2006/0153311 | A1 | 7/2006 | Xue et al. |
| 2006/0233280 | A1 | 10/2006 | Tynderfeldt et al. |
| 2010/0284351 | A1 | 11/2010 | Liang et al. |
| 2013/0121269 | A1 | 5/2013 | Nammi et al. |
| 2015/0381318 | A1 | 12/2015 | Zhanz et al. |
| 2016/0127085 | A1 | 5/2016 | Kim et al. |
| 2016/0128072 | A1 | 5/2016 | Rajagopal et al. |
| 2016/0323864 | A1 | 11/2016 | Molnar et al. |
| 2016/0360529 | A1 | 12/2016 | Lee et al. |

OTHER PUBLICATIONS

U.S. Appl. No. 15/623,963, filed Jun. 15, 2017.
International Preliminary Report on Patentability received for PCT Application Serial No. PCT/US2018/032463 dated Dec. 26, 2019, 12 pages.
Non-Final Office Action received for U.S. Appl. No. 15/623,963 dated Mar. 7, 2018, 18 pages.
Notice of Allowance received for U.S. Appl. No. 15/623,963 dated Jul. 9, 2018, 37 pages.
Huawei et al., "Codeword to layer mapping in NR," 3GPP TSG RAN WG 1 Meeting# 89 Hangzhou, China, May 15-19, 2017, 8 pages.
International Search Report and Written Opinion for International Application Serial No. PCT/US2018/032463 dated Sep. 24, 2018, 19 pages.
Non-Final Office Action received for U.S. Appl. No. 16/166,527 dated Mar. 8, 2019, 29 pages.

* cited by examiner

ADAPTIVE INTERLEAVER FOR WIRELESS COMMUNICATION SYSTEMS

CROSS-REFERENCE TO RELATED APPLICATION

This application is a continuation of, and claims priority to each of, U.S. patent application Ser. No. 16/166,527, filed Oct. 22, 2018, entitled "ADAPTIVE INTERLEAVER FOR WIRELESS COMMUNICATION SYSTEMS," which is a continuation of U.S. patent application Ser. No. 15/623,963 (now U.S. Pat. No. 10,158,454), filed Jun. 15, 2017, entitled "ADAPTIVE INTERLEAVER FOR WIRELESS COMMUNICATION SYSTEMS," the entirety of which application is hereby incorporated herein by reference.

BACKGROUND

In wireless communication systems, MIMO (multiple input, multiple output) antenna systems can significantly increase the data carrying capacity of wireless systems. For these reasons, MIMO is an integral part of third and fourth generation wireless systems. Fifth generation (5G) access networks, which can also be referred to as New Radio (NR) access networks, will also employ MIMO systems, called massive MIMO systems (having on the order of hundreds of antennas at the Transmitter side and/Receiver side). With an $(N_t,N_r)$ MIMO system, where $N_t$ denotes the number of transmit antennas and Nr denotes the receive antennas, the peak data rate multiplies with a factor of $N_t$ over single antenna systems in a rich scattering environment.

While MIMO provides many benefits, the performance of conventional MIMO systems degrades under certain conditions, including at high user equipment speeds. More particularly, when a mobile device moving at high speeds, the receiver of a signal is moving in relation to the transmitter, resulting in the Doppler effect because the frequency of the signal is shifted, such that it is perceived to be different at the receiver than at the transmitter. The performance degradation is severe when the signal to noise ratio (SNR) is high. If the rank in transmission is high, it is also the case that the SNR is high. For high rank systems, the impact due to mismatch between the transmitter and receiver channel qualities is severe.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
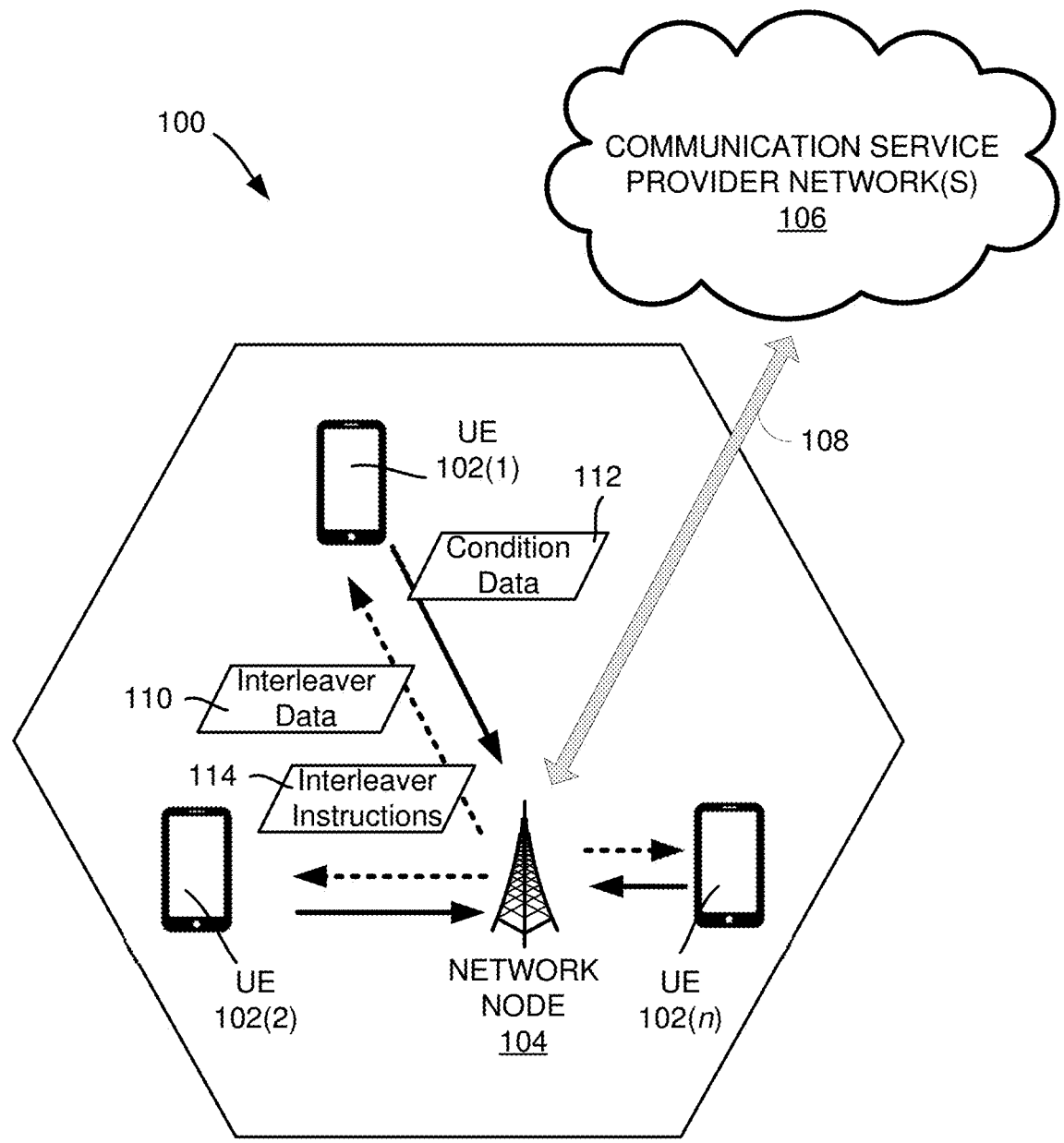
FIG. 1 illustrates an example wireless communication system in which a network node device (e.g., network node) and user equipment (UE) can implement various aspects and implementations of the subject disclosure.

Briefly, one or more aspects of the technology described herein are generally directed towards using an adaptive interleaver in the transmission coding chain of a network device to improve the performance of the MIMO systems. The use of an adaptive interleaver provides more diversity gain when the user equipment is moving (with a high Doppler speed), that is, the interleaver provides frequency diversity. Where multiple interleavers are used as described herein, (e.g., a frequency domain interleaver may be applied for each orthogonal frequency division multiplexing, or OFDM, symbol), a different interleave pattern may be used for each interleaver.

In general, the network device communicates interleaver data to the user equipment, which may include the interleaver pattern or patterns. In one or more implementations, the interleaver data may specify a type of interleaver being used, e.g., a frequency domain interleaver, a frequency and time domain interleaver, or a frequency, time and space domain interleaver, as described herein.

While an interleaver is able to improve the system performance by providing diversity, the use of an interleaver in turn introduces latency. In some scenarios, the diversity gains are negligible. Thus, the technology described herein provides for an adaptive interleaver in which the network device instructs the user equipment to switch on the adaptive interleaver (actually the user equipment's de-interleaver)

when conditions indicate that the use of an interleaver likely improves performance, and instructs the user equipment to switch off the adaptive interleaver when conditions indicate that the use of an interleaver is likely to not improve performance (but rather only introduces undesirable latency).

For simplicity, the non-limiting terms "network device," "radio network node" or "network node" may be used herein for any type of network node that serves user equipment and/or is connected to other network node(s) or network element(s), or any radio node from where user equipment receives signals. Non-limiting examples of radio network nodes are Node B, base station (BS), multi-standard radio (MSR) node such as MSR BS, gNB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS), and so on.

Similarly for reception the non-limiting term "user equipment" (or "UE") is used herein. This term refers to any type of wireless device that communicates with a radio network node in a cellular or mobile communication system. Non-limiting examples of UE comprise a target device, device to device (D2D) UE, machine type UE or UE capable of machine-to-machine (M2M) communication, PDA, Tablet, mobile terminals, smart phone, laptop embedded equipped (LEE), laptop mounted equipment (LME), USB dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly, and so on.

Note that the terms element, elements and antenna ports are also interchangeably used but carry the same meaning herein. In some cases, more than a single antenna element is mapped to a single antenna port.

It should be understood that any of the examples and terms used herein are non-limiting. For instance, the examples are based on mmWave spectrum (between 30 gigahertz (GHz) and 300 GHz) communications between a user equipment exemplified as a smartphone or the like and network device; however virtually any communications devices may benefit from the technology described herein, and/or their use in different spectrums may likewise benefit. Thus, any of the embodiments, aspects, concepts, structures, functionalities or examples described herein are non-limiting, and the technology may be used in various ways that provide benefits and advantages in radio communications in general.

FIG. 1 illustrates an example wireless communication system 100 in accordance with various aspects and embodiments of the subject technology. In one or more embodiments, the system 100 can comprise one or more user equipment UEs 102(1)-102(n).

In various embodiments, the system 100 is or comprises a wireless communication network serviced by one or more wireless communication network providers. In example embodiments, a UE 102 can be communicatively coupled to the wireless communication network via a network node 104. The network node (e.g., network node device) can communicate with the user equipment (UE), thus providing connectivity between the UE and the wider cellular network.

In example implementations, each UE such as the UE 102(1) is able to send and/or receive communication data via a wireless link to the network node 104. The dashed arrow lines from the network node 104 to the UE 102 represent downlink (DL) communications and the solid arrow lines from the UE 102 to the network nodes 104 represents uplink (UL) communications.

The system 100 can further include one or more communication service provider networks 106 that facilitate providing wireless communication services to various UEs, including UES 102(1)-102(n), via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.).

The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

The wireless communication system 100 can employ various cellular systems, technologies, and modulation schemes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub-bands, different types of services can be accommodated in different sub-bands with the most suitable waveform and numerology, leading to an improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

In FIG. 1, as described herein, the network node is configured to provide a user equipment (e.g., 102(1)) with interleaver data 110, such as a certain pattern or set of patterns that may need to be used to de-interleave communications. While operating, the user equipment 102(1) is configured to provide condition data 112 to the network node 104. As will be understood, the network node evaluates the condition data 112, and based on the evaluation, may provide interleaver instructions 114 to the user equipment 102(1). For example, if the condition data 112 indicates the user equipment has a high Doppler metric relative to a threshold value, the network node 104 may instruct the user equipment 102(1) that the network node 104 will be using adaptive interleaver technology to attempt to improve diversity gain. When the user equipment (e.g., 102(1)) acknowledges the receipt of a "turn on" interleaver instruction 114, the network node 104 adaptively turns on interleaving, which the user equipment 102(1) already knows how to de-interleave, and which in general improves communication performance. If later conditions indicate that the use of the adaptive interleaver is not beneficial to a desired extent, (but instead only causes increased latency), the network node 104 may instruct the user equipment 102(1) that the network node 104 will no longer be using the adaptive interleaver, whereby upon UE acknowledgement, non-interleaved data is transmitted and received by the UE unless and until instructed otherwise.

In general, antenna mapping, can be described as a mapping from the output of the data modulation to the different antenna ports. The input to the antenna mapping thus consists of the modulation symbols (QPSK, 16QAM, 64QAM, 256QAM) corresponding to the one or two transport blocks. There is one transport block per transmission time interval (TTI), except for spatial multiplexing, in which case there may be up to two transport blocks per TTI. The output of the antenna mapping comprises a set of symbols for each antenna port. The symbols of each antenna port are subsequently applied to the OFDM modulator, that is, mapped to the basic OFDM time-frequency grid corresponding to that antenna port.

Another concept is that of the rank of the transmission. In multiple antenna techniques, the incoming data can be split to be transmitted through multiple antennas, wherein each data stream processed and transmitted through an antenna is referred to as a transmission layer. The number of transmission layers is typically the number of transmit antennas. The data can be split into several parallel streams, where each stream contains different information. In another type, the incoming data is duplicated and each antenna transmits the same information. The term spatial layer refers to a data stream that includes information not included at the other layers. The rank of the transmission is equal to the number of spatial layers in an LTE spatial multiplexing transmission, that is, equals the number of different transmission layers transmitted in parallel. Even though the information in each layer may be manipulated in different ways by mathematical operations, when the operations do not change the information transmitted, a transmitter can be referred to as operating as a rank-1 transmitter. In a multi-antenna transmitter, different pieces of information are transmitted in parallel simultaneously in up to four different layers; a transmitter transmitting different information in parallel using four layers operates as a rank-4 transmitter.

Figure 2:
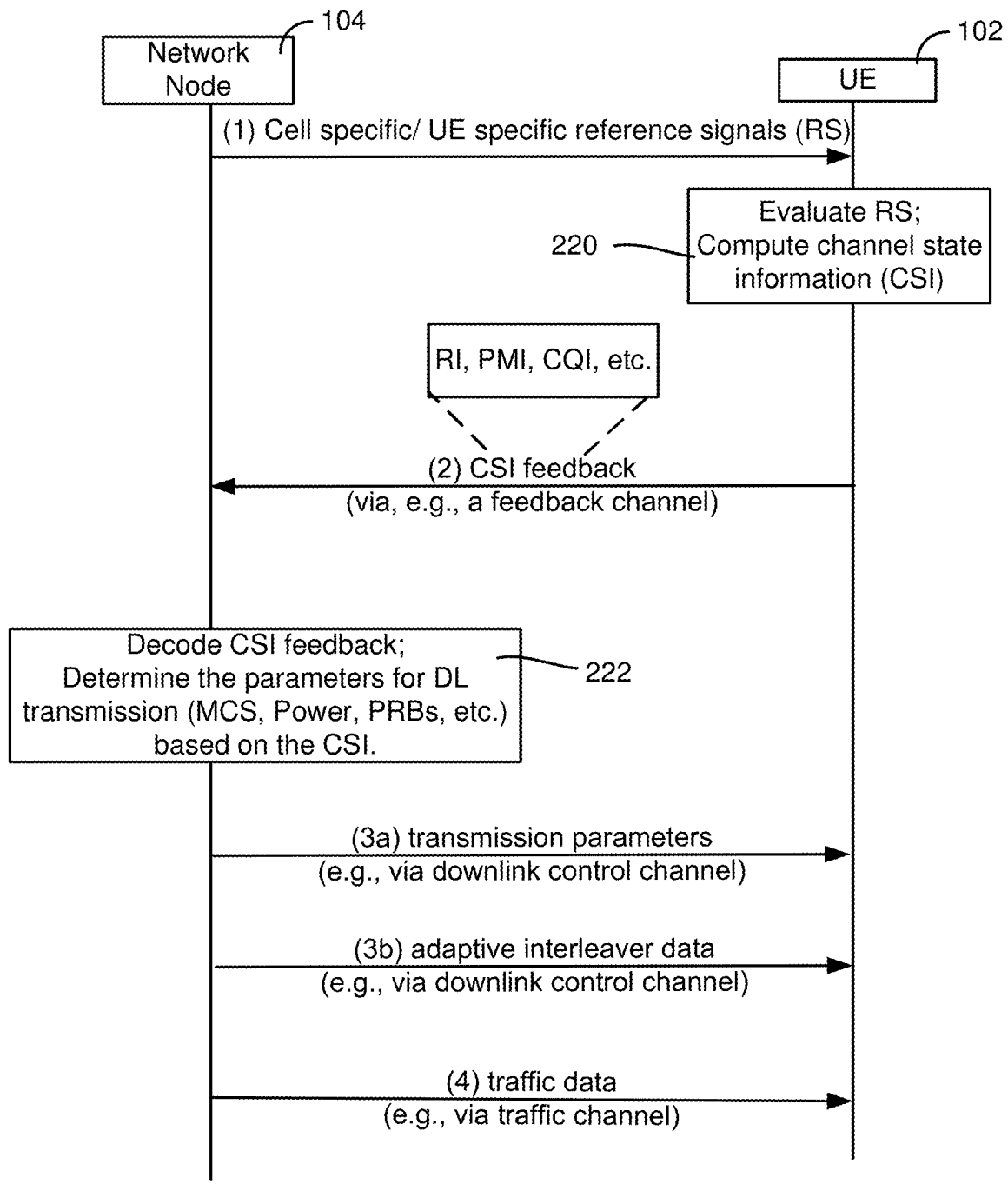
FIG. 2 illustrates an example message sequence chart between a network node device and a UE for a closed loop MIMO scheme, including sending adaptive interleaver data, in accordance with various aspects and implementations of the subject disclosure.

Various multi-antenna transmit techniques are in existence. FIG. 2 illustrates a transaction diagram (e.g., sequence chart) related to one such technique involving a closed loop spatial multiplexing scheme that uses codebook-based precoding; (open loop systems do not require knowledge of the channel at the transmitter, while closed loop systems require channel knowledge at the transmitter, provided by a feedback channel by a UE).

As represented in FIG. 2, a reference signal (also referred to as a pilot signal, or pilot) is first sent from the network node 104 to the UE 102, as shown via arrow labeled one (1). From the reference signals, the UE 102 can compute the channel estimates and the parameters needed for channel state information (CSI) reporting. In LTE, the CSI report comprises, for example, the channel quality indicator (CQI), preceding matrix index (PMI), rank information (RI), and so forth. The CSI report is sent to the network node via a feedback channel either on a periodic basis or on demand based CSI (e.g., aperiodic CSI reporting), as represented in FIG. 2 via the arrow labeled two (2).

In the network node 104, a network node scheduler uses this information in choosing the parameters for scheduling of this particular UE 102, as generally represented via block 222. The network node 104 sends the scheduling parameters to the UE on the downlink control channel referred to as the physical downlink control channel (PDCCH) as generally shown via the arrow labeled (3a).

As described herein and as generally represented via the arrow labeled (3b), in one or more implementations, the network node 104 also sends information to the user equipment 102 that is related to adaptive interleaving, referred to herein as adaptive interleaver data. For example, consider that one or more different interleaving patterns with corresponding de-interleaving patterns may be used if and when adaptive interleaving is turned on. Such pattern data is thus accessible to the user equipment before it is needed. Note that it is feasible to have such information pre-stored in the user equipment 102 in other ways, e.g., downloaded into erasable ROM once in an initial (typically one-time) device configuration operation, whereby the network node 104 need only instruct the user equipment 102 to turn on adaptive interleaving along with any other parameter, e.g., turn on adaptive interleaving using de-interleaving pattern (or pattern set) X.

In any event, once the scheduling and other parameters are accessible to the user equipment 102, actual data transfer takes place from the network node 104 to the UE (e.g., on the physical downlink shared channel (PDSCH)), shown via labeled arrow four (4).

In sum, the network node 104, can transmit a reference signal (RS), which can be beam formed or non-beam formed, to a UE 102. Downlink reference signals are predefined signals occupying specific resource elements within the downlink time-frequency grid. The reference signal can be cell-specific or UE-specific in relation to a profile of the user equipment 102 or some type of mobile identifier. Channel state information reference signals (CSI-RS) are intended to be used by terminals to acquire channel state information (CSI) and beam specific information (beam RSRP). In 5G, CSI-RS is UE-specific so it can have a significantly lower time/frequency density. Demodulation reference signals (DM-RS), sometimes referred to as UE-specific reference signals, are specifically intended to be used by terminals for channel estimation for the data channel. The label "UE-specific" relates to the fact that each demodulation reference signal is intended for channel estimation by a single terminal. That specific reference signal is then only transmitted within the resource blocks assigned for data traffic channel transmission to that terminal. Other reference signals include namely phase tracking reference signals, multicast-broadcast single-frequency network (MB-SFN) signals, and positioning reference signals used for various purposes.

Once received, the UE 102 can evaluate the reference signal and compute CSI, which can be transmitted to the network node as CSI feedback (e.g., a CSI report). The CSI feedback comprises an indicator of channel state information (e.g., known in LTE as a precoding matrix indicator (PMI)), indicator of channel quality (e.g., known in LTE as a channel quality indicator (CQI)), and an indication of rank (e.g., known in LTE as rank indicator (RI)), each of which is discussed further below. The indicator of channel state information (e.g., PMI in LTE) can be used for selection of transmission parameters for the different data streams transmitted between the network node and the UE. In techniques using codebook-based precoding, the network node and UE uses different codebooks, which can be found in standards specifications, each of which relate to different types of MIMO matrices (for example, a codebook of precoding matrices for 2×2 MIMO). The codebook is known (contained) at the node and at the UE, and can contain entries of precoding vectors and matrices, which are multiplied with the signal in the pre-coding stage of the network node. The decision as to which of these codebook entries to select is made at the network node based on CSI feedback provided by the UE, because the CSI is known at the receiver, but not at the transmitter. Based on the evaluation of the reference signal, the UE transmits feedback that comprises recommendations for a suitable precoding matrix out of the appropriate codebook (e.g., points the index of the precoder in one of the codebook entries). This UE feedback identifying the precoding matrix is called the pre-coding matrix indicator (PMI). The UE is thus evaluating which pre-coding matrix would be more suitable for the transmissions between the network node and UE.

Additionally, the CSI feedback also can comprise an indicator of channel quality (e.g., in LTE the channel quality indicator (CQI)), which indicates the channel quality of the channel between the network node and the user equipment for link adaptation on the network side. Depending which value a UE reports, the node transmits data with different transport block sizes. If the node receives a high CQI value from the UE, then it transmits data with larger transport block size, and vice versa.

Also included in the CSI feedback can be the indicator of rank (rank indicator (RI) in LTE terminology), which provides an indication of the rank of the channel matrix, wherein the rank is the number of different transmission data streams (layers) transmitted in parallel, or concurrently (in other words, the number of spatial layers), between the network node and the UE, as discussed above. The RI determines the format of the rest of the CSI reporting messages. As an example, in the case of LTE, when RI is reported to be 1, the rank-1 codebook PMI will be transmitted with one CQI, and when RI is 2, a rank 2 codebook PMI and two CQIs will be transmitted. Since the RI determines the size of the PMI and CQI, it is separately encoded so the receiver can firstly decode the RI, and then use it to decode the rest of the CSI (which as mentioned, comprises the PMI and CQI, among other information). Typically, the rank indication feedback to the network node can be used to select of the transmission layer in downlink data transmission. For example, even though a system is configured in transmission mode 3 in the LTE specifications (or open loop spatial multiplexing) for a particular UE, and if the same UE reports the indicator of rank value as "1" to the network node, the network node may start sending the data in transmit diversity mode to the UE. If the UE reports a RI of "2," the network node might start sending the downlink data in MIMO mode (e.g., transmission mode 3 or transmission mode 4 as described in the LTE specifications). Typically, when a UE experiences bad signal to noise ratio (SNR) and it would be difficult to decode transmitted downlink data, it provides early warning to the network node in the form of feedback by stating the RI value as "1." When a UE experiences good SNR, then it passes this information to the network node indicating the rank value as "2."

After computing the CSI feedback, the UE 102 can transmit the CSI feedback, which can be a channel separate from the channel from which the reference signal was sent. The network node can process the CSI feedback to determine transmission scheduling parameters (e.g., downlink (DL) transmission scheduling parameters), which comprise a modulation and coding parameter applicable to modulation and coding of signals by the network node device particular to the UE 102.

This processing of the CSI feedback by the network node 104, as shown in block 222 of FIG. 2, can comprise decoding the CSI feedback. The UE can decode the RI and then use the decoded information (for example, the obtained size of the CSI) to decode the remainder of the CSI feedback (e.g., the CQI, PMI, etc.). The network node 104 uses the decoded CSI feedback to determine a suitable transmission protocol, which can comprise modulation and coding schemes (MCS) applicable to modulation and coding of the different transmissions between the network node 104 and the UE 102, power, physical resource blocks (PRBs), etc.

The network node 104 can transmit the parameters to the UE 102 via a downlink control channel. Thereafter and/or simultaneously, traffic data (e.g., non-control data such as data related to texts, emails, pictures, audio files videos, etc.) can be transferred, via a data traffic channel, from the network device 104 to the UE 102.

As set forth herein, the performance of closed loop MIMO systems, for example the system described in FIG. 2, degrades at high UE speeds (e.g., a mobile device moving at high speeds). In one or more implementations, in such degraded conditions, the adaptive interleaver technology described herein operates to improve performance, e.g., by increasing diversity gain.

Figure 3:
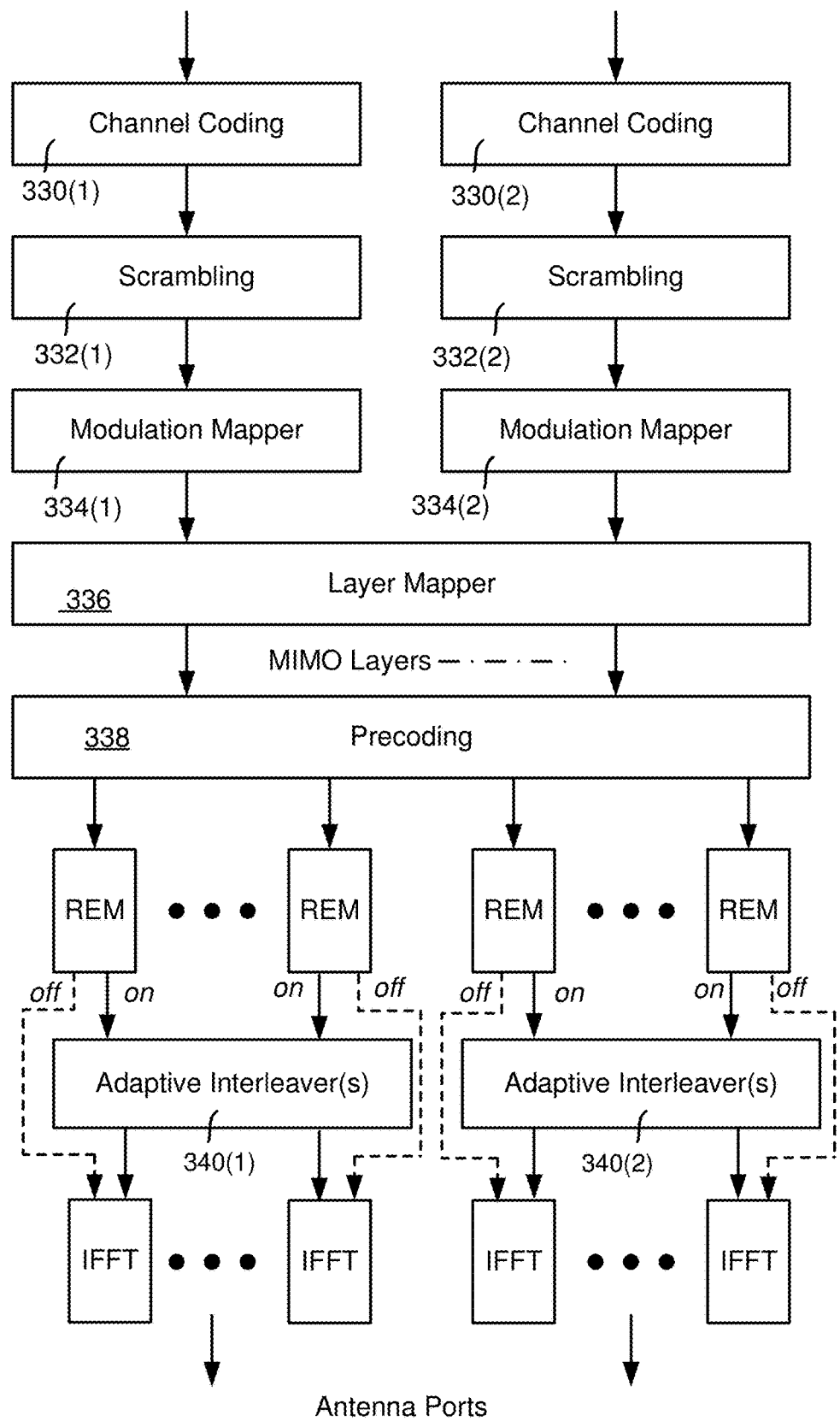
FIGS. 3 and 4 illustrate structures for downlink MIMO Transmission with two codewords (applicable to a single codeword), including with use of an adaptive interleaver, in accordance with various aspects and implementations of the subject disclosure.

FIG. 3 generally shows an example of the transmission side of a MIMO communication system with $N_t$ transmit antennas. There are either one or two transport blocks (two are shown in FIG. 3) based on the number of layers used for data transmission. For example, if the network used more than four layer transmission, then it uses two transport blocks, while if the network schedules the UE with less than or equal to four layers, then it uses single transport block. Conventional channel coding 330(1) and 330(2), scrambling 332(1) and 332(2) and modulation mapper 334(1) and 334(2) operations are performed before a layer mapper 336 maps the data to one or more MIMO layers.

More particularly, once the network decides the number of transport blocks, CRC bits are added to each transport block and passed to the channel encoder (channel coding 330(1) and 330(2)). Each channel encoder adds parity bits to protect the data. Then each stream is passed through a scrambler/conventional interleaver (332(1) and 332(2) in FIG. 3). The interleaver size is controlled by puncturing to increase the data rate. The puncturing is selected by using the information from the feedback channel, for example channel state information sent by the receiver. The interleaved data is passed through a symbol mapper (modulator) shown in FIG. 3 via modulation mappers 334(1) and 334(2)). The symbol mapper is also controlled to adapt to information from the feedback channel.

After modulation, the streams are passed through a layer mapper 336 and a precoder 338. The resultant streams are then mapped to the resource elements (REMs).

If adaptive interleaving is off, in the example implementation of FIG. 3 the adaptive interleavers 340(1) and 340(2) are bypassed (as shown via the dashed arrows), whereby the resource elements are passed though the IFFT (Inverse Fast Fourier Transform) modules, with the resultant symbols mapped to the respective antenna ports for transmission.

If instead adaptive interleaving is on, in the example implementation of FIG. 3 the data is passed to the adaptive interleavers 340(1) and 340(2) for interleaving (as shown via the solid arrows). Then the interleaved resource elements are passed though the IFFT (Inverse Fast Fourier Transform) modules, with the resultant symbols mapped to the respective antenna ports for transmission.

Figure 4:
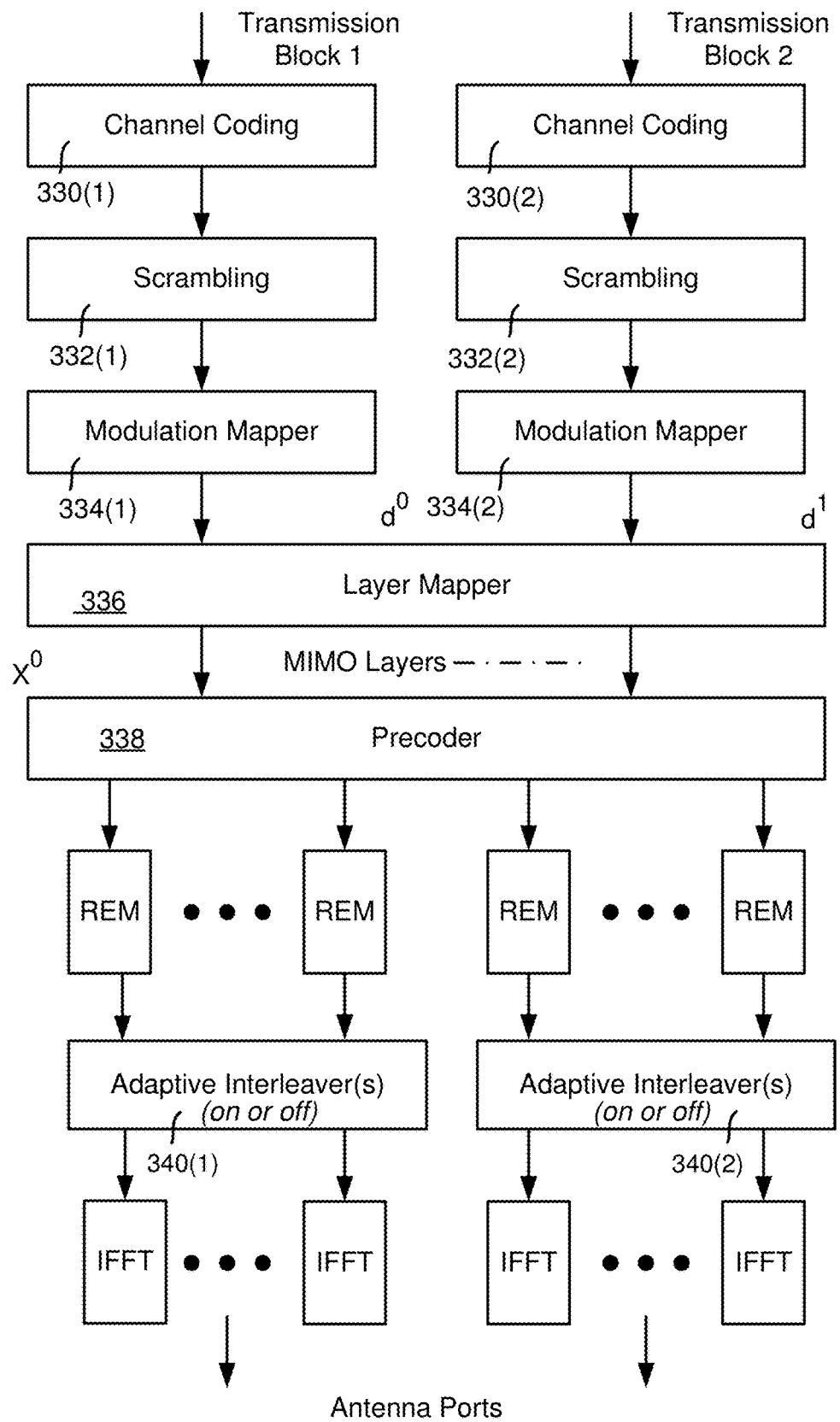

An alternative implementation, shown in FIG. 4, has the resource elements (REMs) passed to adaptive interleavers 440(1) and 440(2) If adaptive modulation is off, in the example of FIG. 4 the adaptive interleavers do not interleave the data (e.g., the interleaving pattern is to use normal indices, e.g., 1-2-3 . . . ) and thus the resource elements are passed "as is" though the IFFT (Inverse Fast Fourier Transform) modules, with the resultant symbols mapped to the respective antenna ports for transmission.

If instead adaptive modulation is on, in the example of FIG. 4 the adaptive interleavers interleave the data according to an interleave pattern, whereby the resource elements are passed in an interleaved pattern though the IFFT (Inverse Fast Fourier Transform) modules, with the resultant symbols mapped to the respective antenna ports for transmission. Note that each interleaver in use may use a different interleaving pattern.

Each interleaver block represented in FIGS. 3 and 4 can be further divided into a symbol level interleaver for the frequency domain, a symbol level interleaver with time and frequency domain, and a symbol level interleaver with time, frequency and space.

For a frequency domain interleaver, a symbol interleaver is added once the layers are mapped to the resource elements. A frequency domain interleaver is applied for each OFDM symbol. Thus for example, if there are 14 OFDM symbols, then 14 interleavers are applied before the IFFT. Note that any or all of the interleaving patterns can be the same or different for each symbol; different interleaving patterns are likely to increase performance in that if the interleaving pattern is different, then maximum diversity gain can be achieved. Note that in this scheme each layer needs to have 14 OFDM symbol interleavers, and the interleaving patterns per each layer can be same or different as that of the first layer. Thus, if there is 4-layer transmission, then there are 14*4=56 interleavers.

For a frequency and time domain interleaver scheme, an interleaver is added once the symbols are mapped into the time domain. For example, once the symbols are mapped into frequency, say 14 OFDM symbols, then an interleaver is applied on the whole block. As a result, only one interleaver is needed per each IFFT branch; hence if there is 4-layer transmission, then there are four interleavers. Again, note that the interleavers can be the same or different for each branch.

For a frequency, time domain and space interleaver scheme, the interleaver is used between the symbols between the layers within a codeword. Thus, one only one interleaver is used between the layers once the symbols are mapped to the frequency domain and then time domain.

Is should be noted that this technology works well with any one of the above schemes. The network and the UE needs to know the scheme and interleaving pattern, which for efficiency is preferably done ahead of time, e.g. as described above the network conveys this information via RRC signaling. In alternative implementations, the network can indicate the interleaving pattern via the downlink control channel. These options are represented by the operation labeled 502 in FIG. 5. In other alternative implementations, the network and the UE know this interleaving pattern a priori, e.g., via standardization mapping tables.

As described herein, even though the interleaver improves the performance by providing diversity, this in turn introduces the latency and in some scenarios the gains from diversity are negligible. In such scenarios, the network can signal to the UE to switch off the interleaver, and then bypass interleaving (FIG. 3), or send the interleaving pattern as normal indices i.e. 1-2-3 . . . (FIG. 4).

Figure 5:
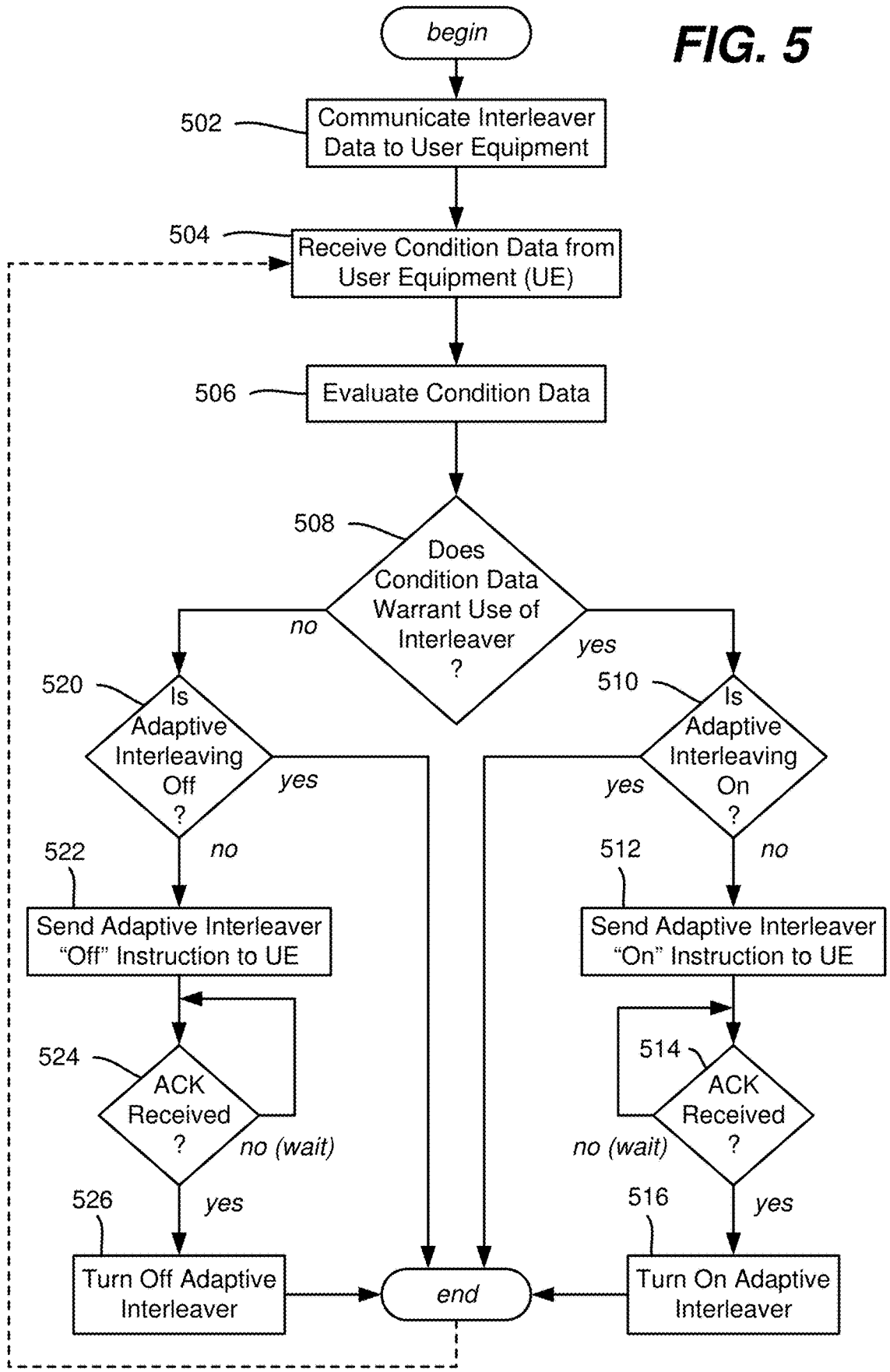
FIG. 5 illustrates an example flow diagram of operations of a network node for turning on or turning off adaptive interleaving, in accordance with various aspects and implementations of the subject disclosure.

As generally represented in the example operations of FIG. 5, exemplified as steps, when UE condition data is received (step 504) at the network node, the network node evaluates the condition data, (step 506) determine whether the condition data warrants the use of an interleaver (step 508). If so, step 508 branches to step 510, where the network node determines whether an adaptive interleaving is already on. If not, step 512 is executed to send an adaptive interleaver "on" instruction to the user equipment. Step 514 represents waiting until an acknowledgement is received from the UE, and when received, step 516 turns on the network nodes adaptive interleaver. Note that if an acknowledgement is not received, or not received within a timeout time, the network node can resend of the instruction or take other actions.

It is also possible that the condition data may indicate that the use of adaptive interleaving is not desirable, that is, it adds latency without providing acceptable performance improvements. Thus, step 508 may instead branch to step 520, such that if the adaptive interleaving is not already off, step 522 sends an adaptive interleaver "off" instruction to the UE. Step 524 represents waiting for an acknowledgement to be received, at which time the network node turns off the adaptive interleaver operations. Again, a timeout may be used when an acknowledgment is not received.

It should be noted that if adaptive interleaving is on, and the condition data indicates that the performance is still somewhat low, the network node may take additional steps to improve performance. For example, in addition to adaptive interleaving, other adjustments to the transmissions may be made.

Figure 6:
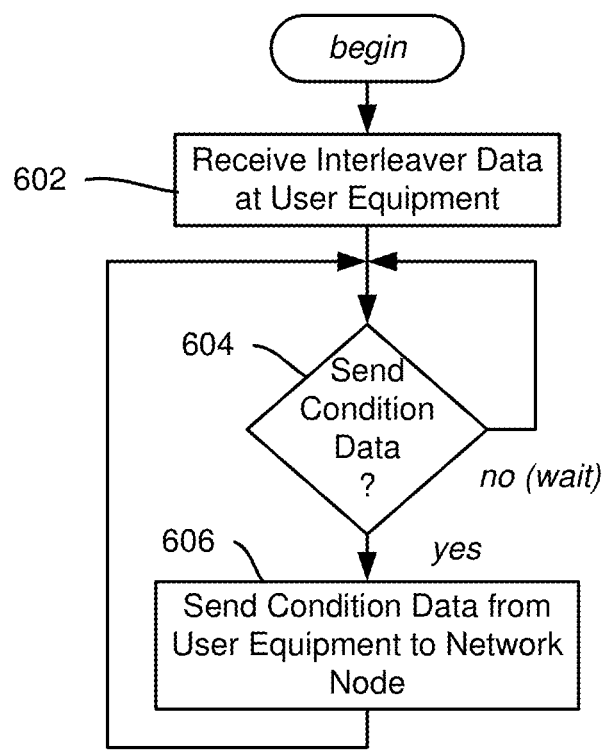
FIG. 6 illustrates an example flow diagram of operations of a user equipment for sending condition data that is evaluated at the network node for turning on or turning off adaptive interleaving, in accordance with various aspects and implementations of the subject disclosure.

FIG. 6 represents operations in the form of example steps that may be taken by user equipment with respect to adaptive de-interleaving, beginning at step 602 where user equipment receives the interleaver data, e.g., the pattern(s) and scheme to use. At some later time, step 604 evaluates whether condition data needs to be sent to the network node, e.g., periodically, or on request from the network node. If the condition data needs to be sent, step 606 sends the condition data.

Figure 7A:
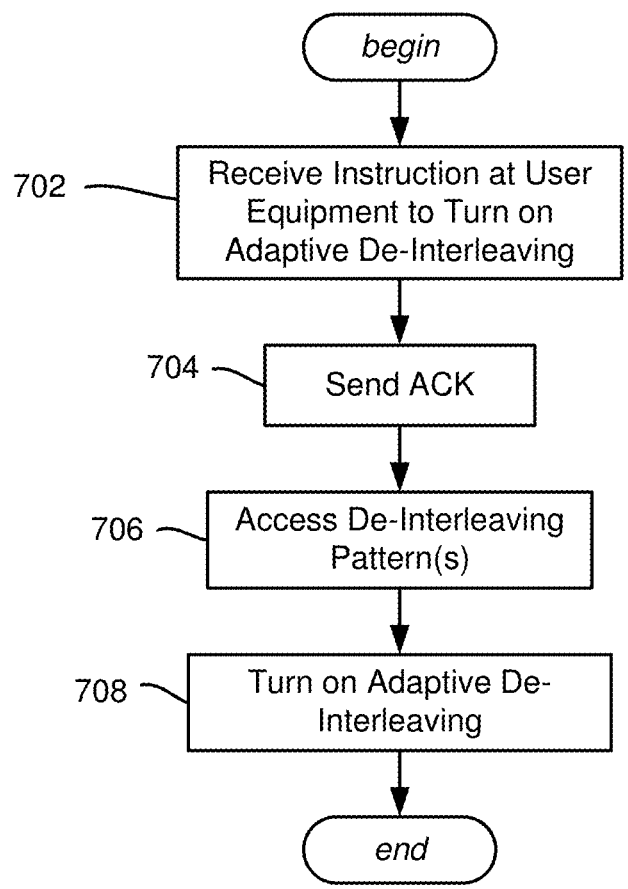
FIG. 7A illustrates an example flow diagram of operations of a user equipment for with respect to turning on adaptive interleaving, in accordance with various aspects and implementations of the subject disclosure.

FIG. 7A represents operations in the form of example steps that may be taken by user equipment with respect to turning on adaptive de-interleaving, beginning at step 702 where user equipment receives an instruction to turn on adaptive interleaving (that is, de-interleaving from the perspective of the user equipment). When received and processed, step 704 sends the ACK. Step 706 accesses the pattern or patterns, which are applied at step 708 de-interleave received communications traffic data.

Figure 7B:
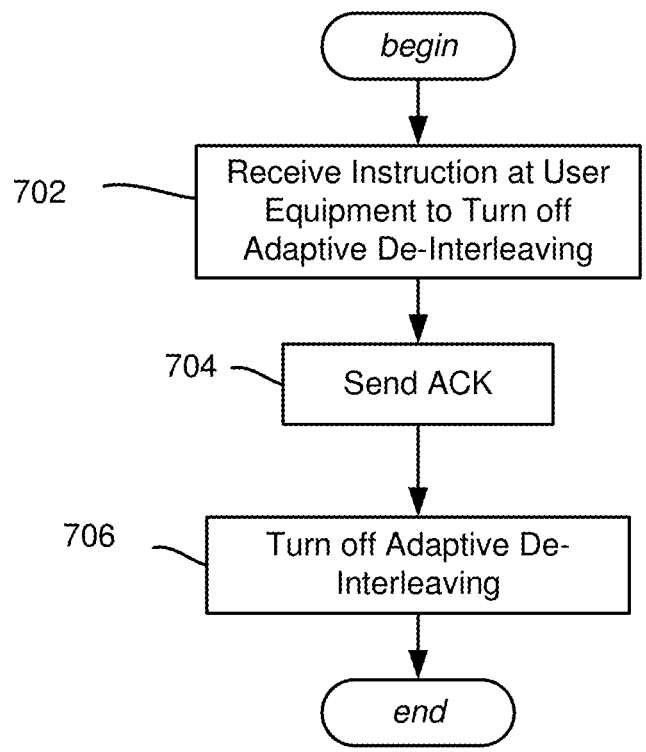
FIG. 7B illustrates an example flow diagram of operations of a user equipment for with respect to turning adaptive interleaving, in accordance with various aspects and implementations of the subject disclosure.

FIG. 7B represents operations in the form of example steps that may be taken by user equipment with respect to turning off adaptive interleaving (that is, de-interleaving from the perspective of the user equipment), beginning at step 702 where user equipment receives an instruction to turn off adaptive interleaving. When received and processed, step 704 sends the ACK. Step 706 turns off the adaptive interleaving (de-interleaving) at the user equipment.

Figure 8:
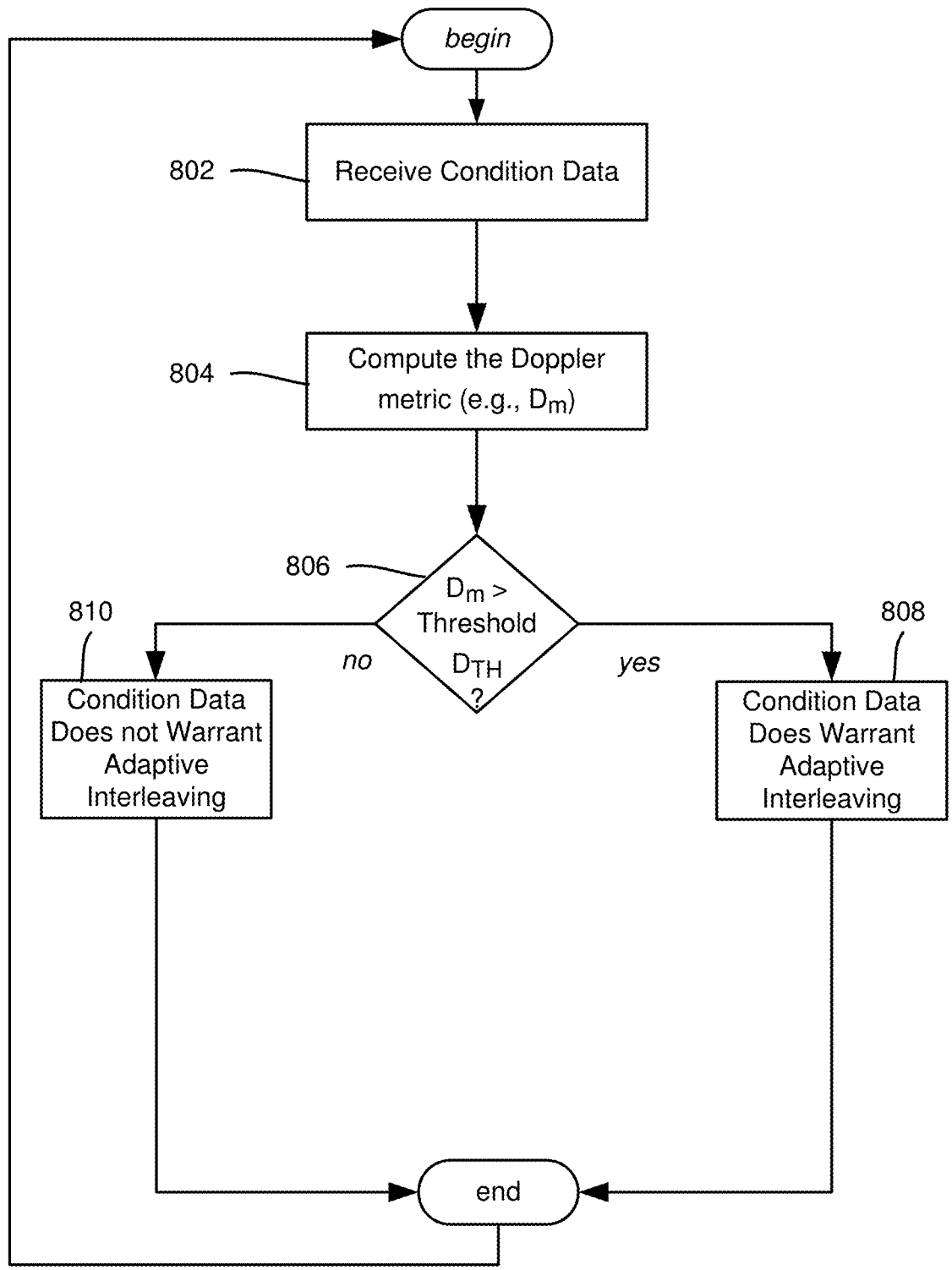
FIG. 8 illustrates an example flow diagram of operations of a network node for using a Doppler metric as a condition decision criterion with respect to using adaptive interleaving, in accordance with various aspects and implementations of the subject disclosure.

As described above, one type of condition data is the Doppler metric/speed of the UE. The network can estimate the Doppler metric to determine whether the interleaver is needed for a particular UE not. For example, as represented in FIG. 8, once the condition data is received (step 802), the speed or Doppler metric may be computed (step 804). If at step 806 the metric/speed $D_m$ is greater than a specified threshold Dth, the network node considers that the condition data warrants adaptive interleaving at step 808, whereby (e.g., via FIG. 5) the network node can inform the UE that it is using an interleaver in the transmission chain and thus the UE needs to de-interleave when receiving the data. If not greater than the threshold at step 806, then step 810 represents operations for not turning on (or if on, turning off) adaptive interleaving, e.g. via FIG. 5.

Figure 9:
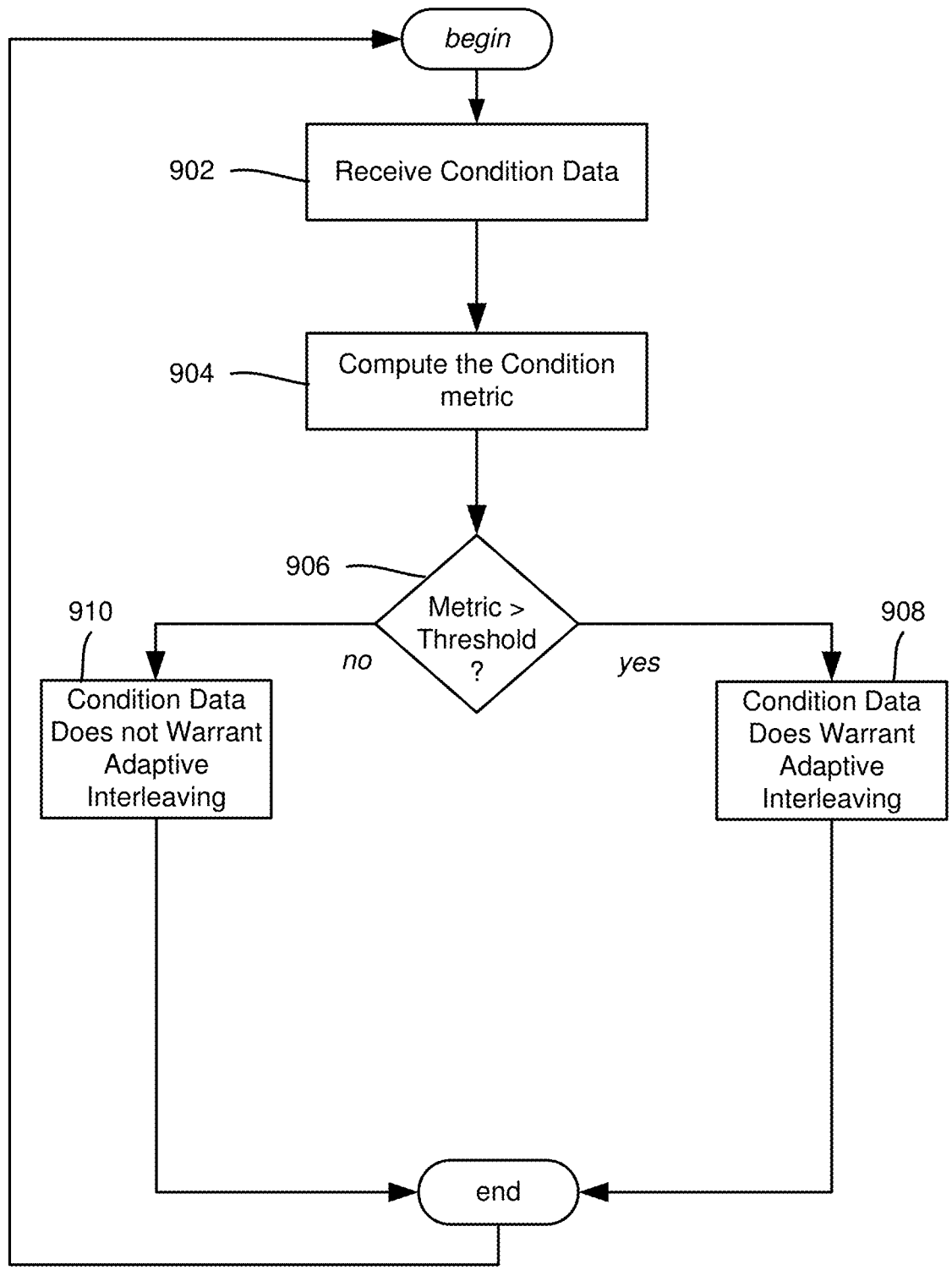
FIG. 9 illustrates an example flow diagram of operations of a network node for using any suitable condition metric as a condition decision criterion with respect to using adaptive interleaving, in accordance with various aspects and implementations of the subject disclosure.

Other criteria may be used instead of or in addition to the Doppler metric. FIG. 9 is a flow diagram similar to FIG. 8 for any generic metric within the condition data. For brevity, the operations of FIG. 9 are not described again; however it is understood that any of the following criteria, as well as other criteria not explicitly described herein may be used to trigger adaptive interleaving or turn off adaptive interleaving.

One such criteria and is the long term signal-to-noise-plus-interference ratio (SINR) of the UE. To this end, the network node estimates the long term SINR of the UE two determine whether to use the adaptive interleaver or not. For example, if the SINR is less than some threshold value such as 15 dB, the network node can indicate that the interleaver is switched off. Hence the network switches off the interleaver if the long term SINR is less than the pre-defined threshold. A pre-defined SINR threshold for switching on the interleaver, which may not be the same as the threshold for switching off the interleaver, may be similarly used.

Another criterion that may be available from the condition data is the path loss of the U. Similar to SINR, the network node may indicate to the UE to switches off the interleaver if the path loss is greater than a pre-defined threshold value (note that path loss is a negative value), and or switch on the interleaver is the past loss is less than a pre-defined threshold value.

Transmission rank is another possible criterion. More particularly, it is well known that at low SINRs, the transmission rank is either 1 or 2, and at high SINRs the probability of rank 3 and 4 is higher. Because the gains due to the adaptive interleaver are generally significant only at high SINR, if the transmission rank is greater than a pre-defined threshold, then the network switches on the interleaver, else it will communicate to the UE to switch off the interleaver. In another embodiment, without explicit signaling, the network and UE can have a priori understanding that for low ranks the network does not use interleaver and for high rank transmission, the network uses an interleaver.

Resource block/physical resource block utilization and/or traffic pattern condition data are other possible criteria for adaptive interleaving. It has been observed that diversity gains are often negligible with a lesser number of PRB allocations. For example, when the UE is moving with a speed of 3 Kmph, which is typical scenario for eMBB data, it has been observed that there is no gain with the introduction of a symbol interleaver in the frequency domain. The gain is around 2% at high SNR. The gains are low because, the probability of the packet pass is around 95% for slow speed channels, and the frequency diversity may not provide significant gains at slow speeds. Note that the conventional link adaptation is used in this case, i.e., the symbol interleaver is transparent to the UE for link adaptation. Thus, when the resource block utilization over a period of time is less than a pre-defined threshold, then it can be reasonably assumed that the particular UE does not require much traffic, and the interleaver can be switched off.

As can be readily appreciated, a combination of any of the above criterion may be used to turn on adaptive interleaving and turn off the adaptive interleaving. For example, a consider that an implementation wants to use the Doppler metric, the SINR data and resource block utilization together to determine the use of adaptive interleaving. Again, different thresholds may be used turning on adaptive interleaving relative to the thresholds used for turning off the adaptive interleaving (e.g., once on).

Figure 10:
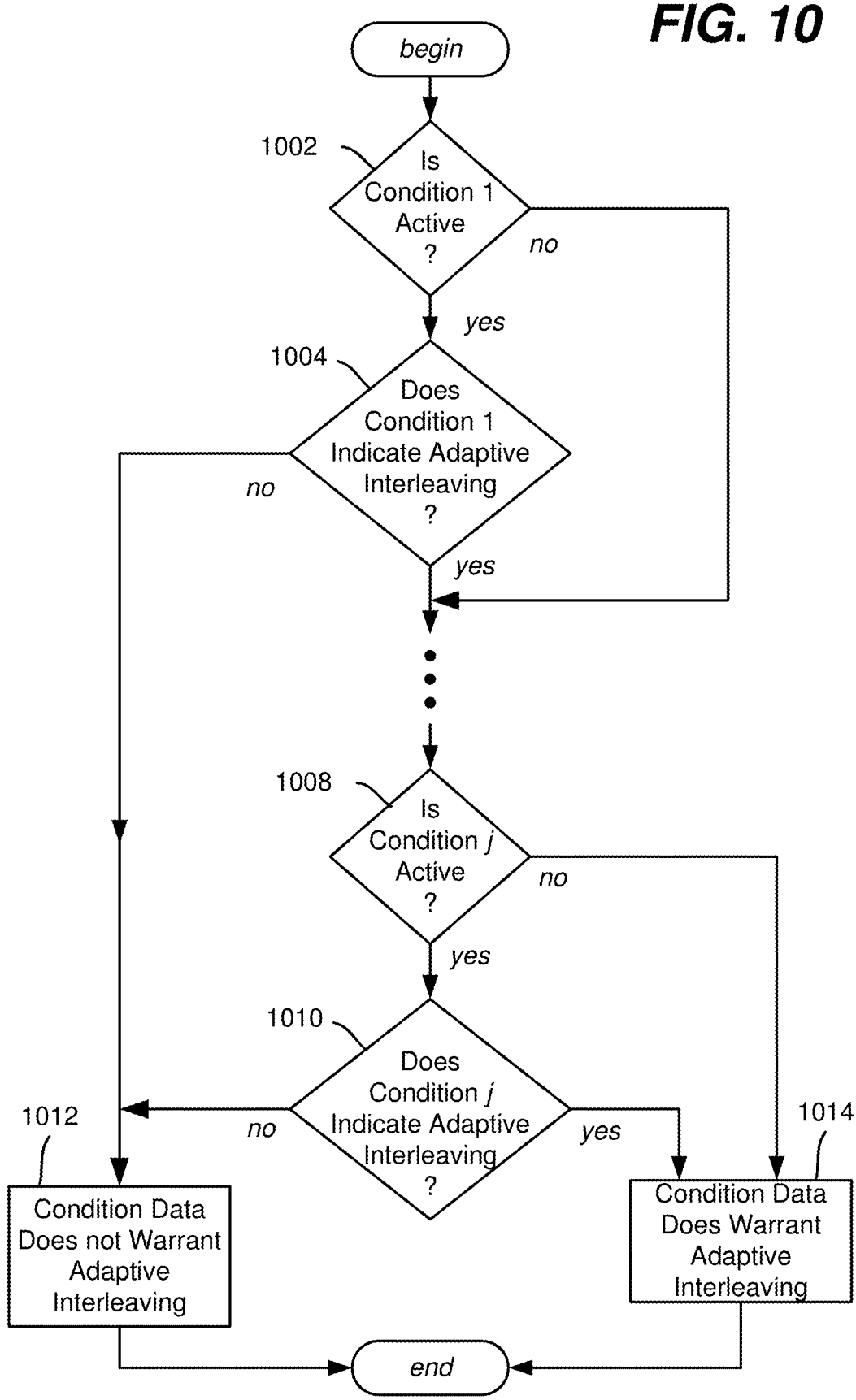
FIG. 10 illustrates an example flow diagram of operations of a network node for using any combination of active conditions as decision criteria with respect to using adaptive interleaving, in accordance with various aspects and implementations of the subject disclosure.

FIG. 10 is a flow diagram in which the network node may be configured to selectively consider which condition data to use as criteria for the adaptive interleaving for any of j criteria, that is, which conditions are considered to be active with respect to adaptive interleaving. Step 1002 checks whether condition 1 (e.g. the Doppler metric) is active with respect to being evaluated with respect to adaptive interleaving. If so, step 1004 evaluates the metric for condition 1. If not, this evaluation is skipped. The process continues for any number of possible condition criteria, as represented via steps 1008 and 1010. Note that FIG. 10 is an "AND" operation; if any condition is not met, then step 1012 is performed which considers the condition data to not warrant adaptive interleaving such as evaluated at step 508 of FIG. 5. If each condition is met, step 1014 is instead performed, which considers the condition data to warrant adaptive interleaving, and thus turn it on if not already on.

As can be readily appreciated, and "OR" model is straightforward to implement and is not separately described except to note that any condition considered active that also indicates adaptive interleaving is to be turned on is considered to warrant adaptive interleaving. Note that, for example, that an "OR" model may be used to turn on adaptive interleaving while an "AND" model may be used to turn off interleaving, or vice-versa. It is also feasible to use different criteria combinations for turning on adaptive interleaving versus the criteria used for turning off adaptive interleaving.

It is also feasible to have a scoring model, in that some conditions may be considered worse than others with respect to adaptive interleaving usage providing benefits. For example Doppler speed may be given one weight, path loss another weight, transmission rank another weight, and so on. If the combined score of the weights reaches a threshold, then adaptive interleaving is turned on, otherwise it is turned off. Again, turning on vs. turning off may have different weights and/or scoring values.

Figure 11:
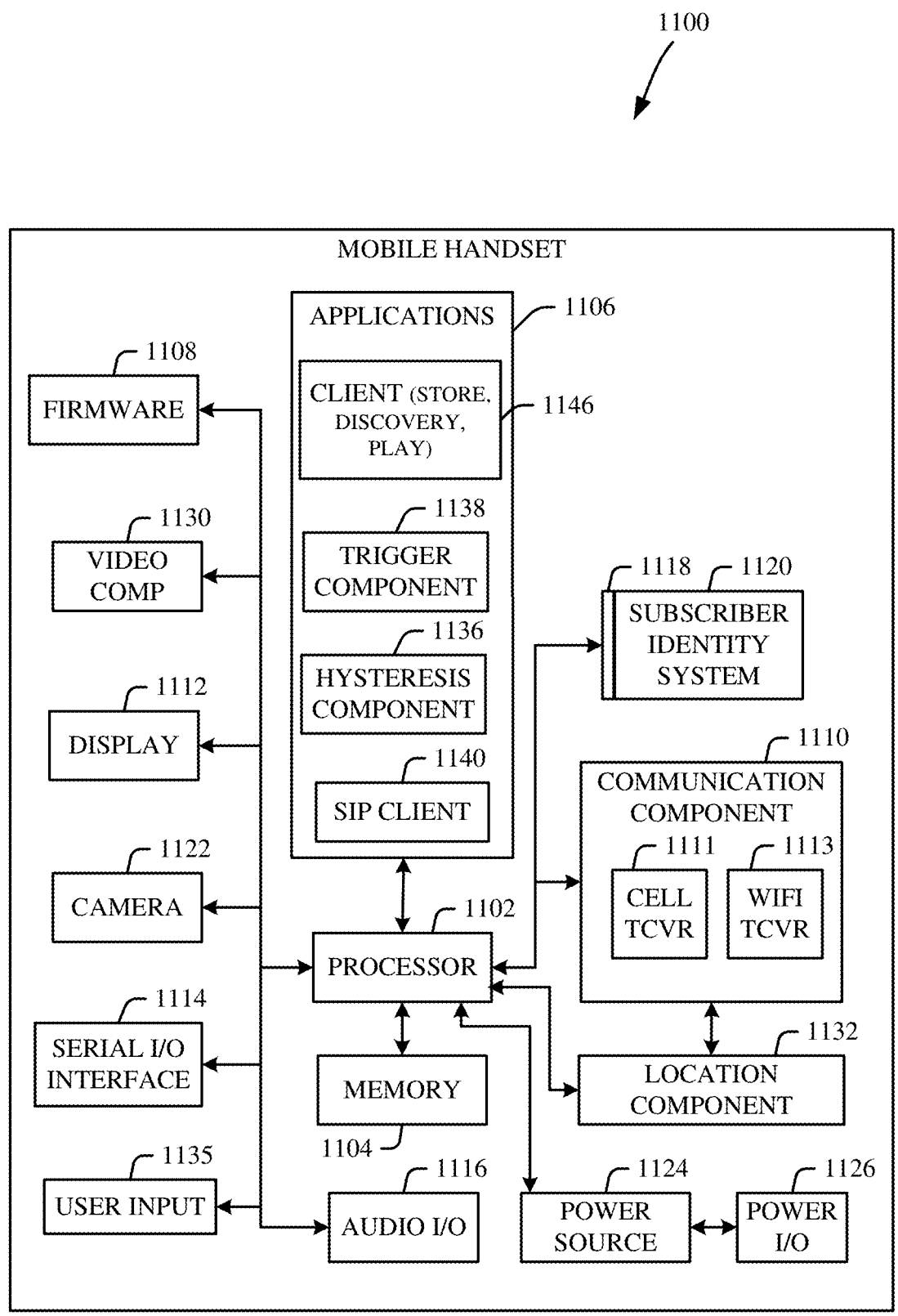
FIG. 11 illustrates an example block diagram of an example user equipment that for example can be a mobile handset in accordance with various aspects and implementations of the subject disclosure.

Referring now to FIG. 11, illustrated is an example block diagram of an example mobile handset 1100 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1194) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communications component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or a decoded format.

A video processing component 1122 (e.g., a camera) can be provided for decoding encoded multimedia content. The video processing component 1122 can aid in facilitating the generation, editing, and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1136 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 1110, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
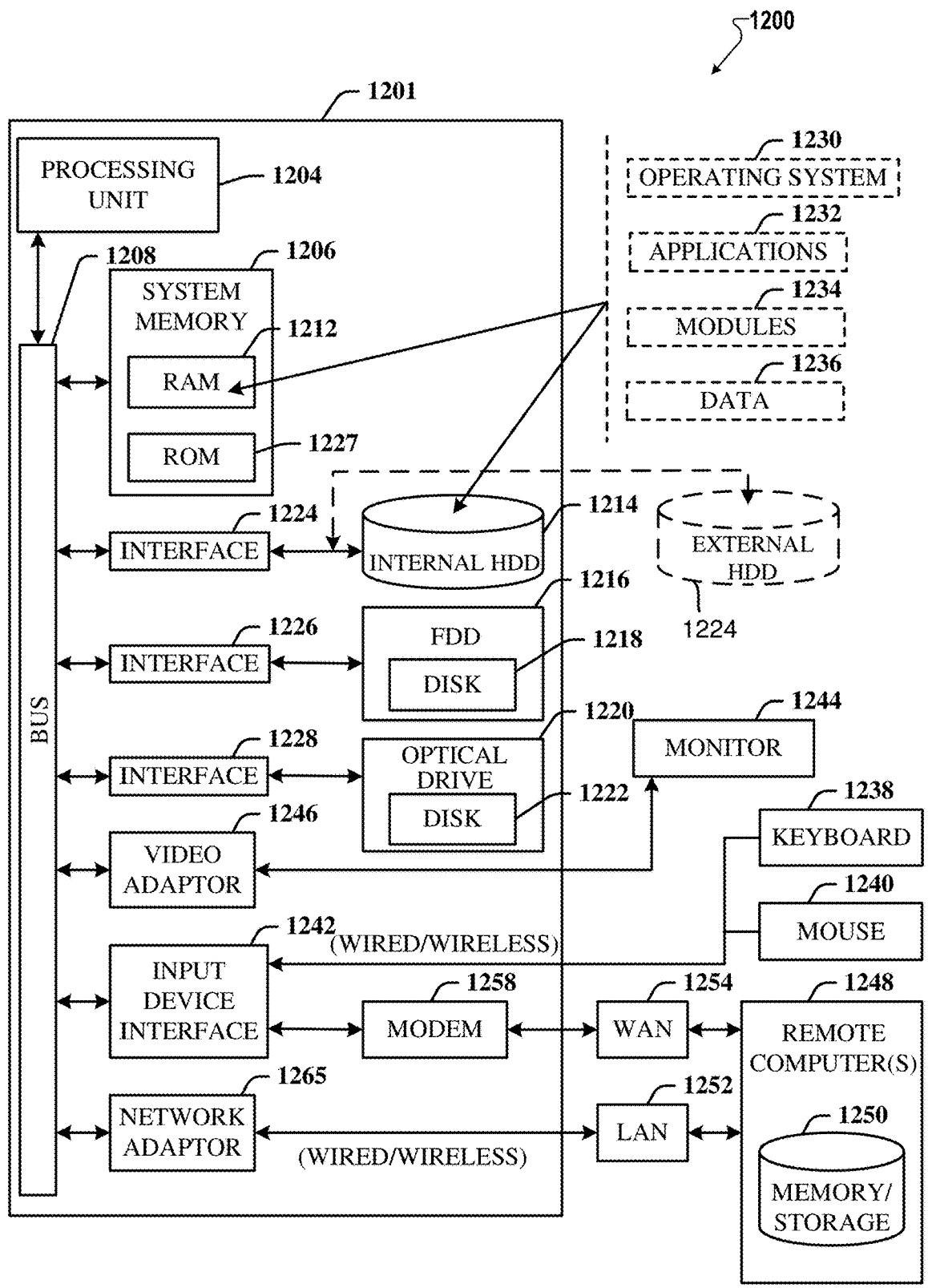
FIG. 12 illustrates an example block diagram of a computer that can be operable to execute processes and methods, in accordance with various aspects and implementations of the subject disclosure.

Referring now to FIG. 12, illustrated is an example block diagram of an example computer 1200 operable to engage in a system architecture that facilitates wireless communications according to one or more embodiments described herein. The computer 1200 can provide networking and communication capabilities between a wired or wireless communication network and a server (e.g., Microsoft server) and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 12 is but one example of a computing device.

In order to provide a context for the various aspects of the disclosed subject matter, FIG. 12 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1220 (see below), non-volatile memory 1222 (see below), disk storage 1224 (see below), and memory storage 1246 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 12 illustrates a block diagram of a computing system 1200 operable to execute the disclosed systems and methods in accordance with an embodiment. Computer 1212, which can be, for example, part of the hardware of system 1220, includes a processing unit 1214, a system memory 1216, and a system bus 1218. System bus 1218 couples system components including, but not limited to, system memory 1216 to processing unit 1214. Processing unit 1214 can be any of various available processors. Dual microprocessors and other multiprocessor architectures also can be employed as processing unit 1214.

System bus 1218 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

System memory 1216 can include volatile memory 1220 and nonvolatile memory 1222. A basic input/output system (BIOS), containing routines to transfer information between elements within computer 1212, such as during start-up, can be stored in nonvolatile memory 1222. By way of illustration, and not limitation, nonvolatile memory 1222 can include ROM, PROM, EPROM, EEPROM, or flash memory. Volatile memory 1220 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 can also include removable/non-removable, volatile/non-volatile computer storage media. FIG. 12 illustrates, for example, disk storage 1224. Disk storage 1224 includes, but is not limited to, devices like a magnetic disk drive, floppy disk drive, tape drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to system bus 1218, a removable or non-removable interface is typically used, such as interface 1226.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 12 describes software that acts as an intermediary between users and computer resources described in suitable operating environment 1200. Such software includes an operating system 1228. Operating system 1228, which can be stored on disk storage 1224, acts to control and allocate resources of computer system 1212. System applications 1230 take advantage of the management of resources by operating system 1228 through program modules 1232 and program data 1234 stored either in system memory 1216 or on disk storage 1224. It is to be noted that the disclosed subject matter can be implemented with various operating systems or combinations of operating systems.

A user can enter commands or information into computer 1212 through input device(s) 1236. As an example, a mobile device and/or portable device can include a user interface embodied in a touch sensitive display panel allowing a user to interact with computer 1212. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1214 through system bus 1218 by way of interface port(s) 1238. Interface port(s) 1238 include, for example, a serial port, a parallel port, a game port, a universal serial bus (USB), an infrared port, a Bluetooth port, an IP port, or a logical port associated with a wireless service, etc. Output device(s) 1240 and a move use some of the same type of ports as input device(s) 1236.

Thus, for example, a USB port can be used to provide input to computer 1212 and to output information from computer 1212 to an output device 1240. Output adapter 1242 is provided to illustrate that there are some output devices 1240 like monitors, speakers, and printers, among other output devices 1240, which use special adapters. Output adapters 1242 include, by way of illustration and not limitation, video and sound cards that provide means of connection between output device 1240 and system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. Remote computer(s) 1244 can be a personal computer, a server, a router, a network PC, cloud storage, cloud service, a workstation, a microprocessor based appliance, a peer device, or other common network node and the like, and typically includes many or all of the elements described relative to computer 1212.

For purposes of brevity, only a memory storage device 1246 is illustrated with remote computer(s) 1244. Remote computer(s) 1244 is logically connected to computer 1212 through a network interface 1248 and then physically connected by way of communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1250 refer(s) to hardware/software employed to connect network interface 1248 to bus 1218. While communication connection 1250 is shown for illustrative clarity inside computer 1212, it can also be external to computer 1212. The hardware/software for connection to network interface 1248 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," "subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. Radio network equipment, comprising:
a processor; and
a memory that stores executable instructions that, when executed by the processor, facilitate performance of operations, the operations comprising:
determining that a current interleaving of data communications between the radio network equipment and a user equipment is no longer beneficial according to a defined criterion; and
in response to the determining,
communicating adaptive interleaving information to the user equipment that instructs the user equipment to turn off adaptive interleaving at the user equipment, and
communicating non-interleaved communications data between the radio network equipment and the user equipment.

2. The radio network equipment of claim 1, wherein the determining comprises determining that the current interleaving of data communications between the radio network equipment and the user equipment no longer improves data communication performance between the radio network equipment and the user equipment.

3. The radio network equipment of claim 1, wherein the determining comprises determining that the current interleaving of data communications between the radio network equipment and the user equipment introduces undesirable latency.

4. The radio network equipment of claim 1, wherein the determining comprises determining that the current interleaving of data communications between the radio network equipment and the user equipment adds latency that is determined to negate improved data communication performance between the radio network equipment and the user equipment from the current interleaving.

5. The radio network equipment of claim 1, wherein the operations further comprise deactivating an adaptive interleaver at the radio network equipment.

6. The radio network equipment of claim 1, wherein the determining that the current interleaving of data communications between the radio network equipment is no longer desirable comprises evaluating condition information related to the user equipment.

7. The radio network equipment of claim 6, wherein the evaluating the condition information comprises evaluating at least one value from a group of values, the group comprising a Doppler metric estimate corresponding to a speed of the user equipment, a signal quality measure over a time duration, a path loss measure of the user equipment, a transmission rank currently in use, a resource block utilization value from user equipment resource block utilization data over a time duration, or traffic pattern value from user equipment traffic pattern data over the time duration.

8. A method, comprising:
   determining, by network equipment comprising a processor, that a current interleaving of data communications between the network equipment and a user equipment is no longer beneficial according to defined criterion; and
   in response to the determining,
      communicating, by the network equipment, adaptive interleaving information to the user equipment that instructs the user equipment to turn off adaptive interleaving at the user equipment, and
      communicating, by the network equipment, non-interleaved communications data between the network device and the user equipment.

9. The method of claim 8, wherein the determining comprises determining that the current interleaving of data communications between the network equipment and a user equipment no longer improves data communication performance between the network equipment and the user equipment.

10. The method of claim 8, wherein the determining comprises determining that the current interleaving of data communications between the network equipment and the user equipment introduces undesirable latency.

11. The method of claim 8, wherein the determining comprises determining that the current interleaving of data communications between the network equipment and the user equipment adds latency that is determined to negate improved data communication performance between the network equipment and the user equipment from the current interleaving.

12. The method of claim 8, further comprising deactivating, by the network equipment, an adaptive interleaver at the network equipment.

13. The method of claim 8, wherein the determining that the current interleaving of data communications between the network equipment is no longer desirable comprises evaluating condition information related to the user equipment.

14. The method of claim 13, wherein the evaluating the condition information comprises evaluating at least one value from a group of values, the group comprising a Doppler metric estimate corresponding to a speed of the user equipment, a signal quality measure over a time duration, a path loss measure of the user equipment, a transmission rank currently in use, a resource block utilization value from user equipment resource block utilization data over a time duration, or traffic pattern value from user equipment traffic pattern data over the time duration.

15. A non-transitory machine-readable medium, comprising executable instructions that, when executed by a processor of network equipment, facilitate performance of operations, the operations comprising:
   determining that a current interleaving of data communications between network equipment and a user equipment is no longer beneficial according to defined criterion; and
   in response to the determining,
      communicating adaptive interleaving information to the user equipment that instructs the user equipment to turn off adaptive interleaving at the user equipment, and
      communicating non-interleaved communications data between the network equipment and the user equipment.

16. The non-transitory machine-readable medium of claim 15, wherein the determining comprises determining that the current interleaving of data communications between the network equipment and a user equipment no longer improves data communication performance between the network equipment and the user equipment.

17. The non-transitory machine-readable medium of claim 15, wherein the determining comprises determining that the current interleaving of data communications between the network equipment and the user equipment introduces undesirable latency.

18. The non-transitory machine-readable medium of claim 15, wherein the determining comprises determining that the current interleaving of data communications between the network equipment and the user equipment adds latency that is determined to negate improved data communication performance between the network equipment and the user equipment from the current interleaving.

19. The non-transitory machine-readable medium of claim 15, wherein the operations further comprise deactivating an adaptive interleaver at the network equipment.

20. The non-transitory machine-readable medium of claim 15, wherein the determining that the current interleaving of data communications between the network equipment is no longer desirable comprises evaluating condition information related to the user equipment.

\* \* \* \* \*